C. A. HENNEUSE.
TRACTION APPARATUS.
APPLICATION FILED APR. 29, 1913.
1,153,845.
Patented Sept. 14, 1915.
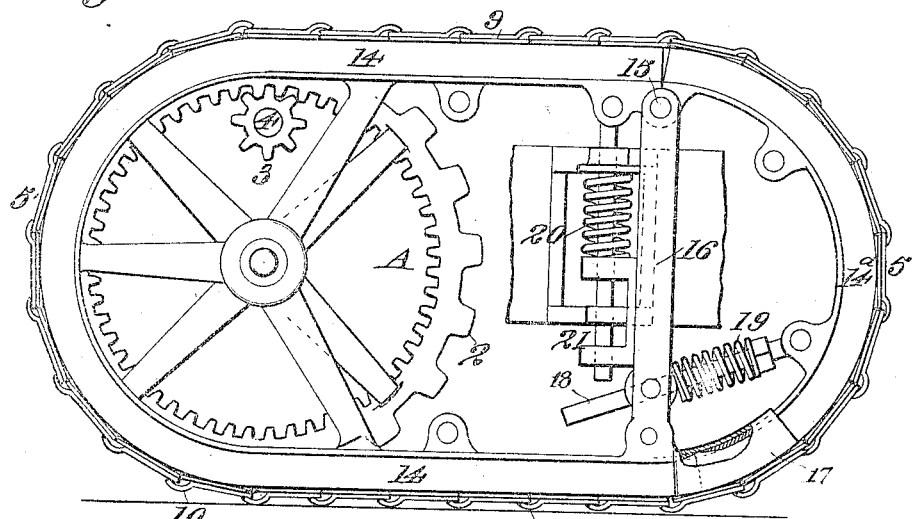
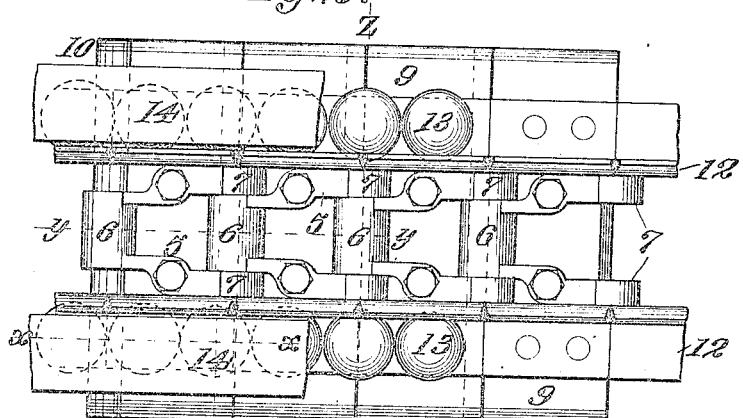
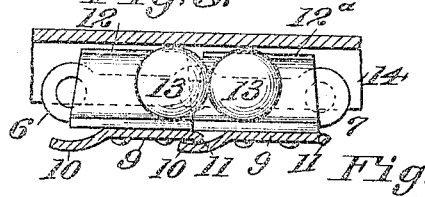
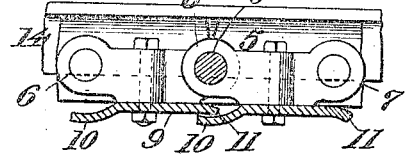
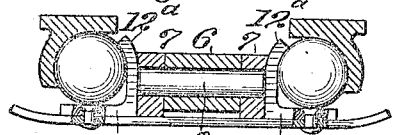
WITNESSES:
INVENTOR
Clarence A. Henneuse,
BY G. H. Strong,
ATTORNEY

UNITED STATES PATENT OFFICE.

CLARENCE A. HENNEUSE, OF SAN JOSE, CALIFORNIA, ASSIGNOR, BY MESNE ASSIGNMENTS, OF ONE-THIRD TO S. FRAME, OF BENICIA, CALIFORNIA, AND ONE-THIRD TO W. J. BENSON, OF SAN JOSE, CALIFORNIA.

TRACTION APPARATUS.

1,153,845.   Specification of Letters Patent.   Patented Sept. 14, 1915.

Application filed April 29, 1913. Serial No. 764,341.

*To all whom it may concern:*

Be it known that I, CLARENCE A. HENNEUSE, a citizen of the United States, residing at San Jose, in the county of Santa Clara and State of California, have invented new and useful Improvements in Traction Apparatus, of which the following is a specification.

My invention relates to traction apparatus, and that class which is especially employed upon traction engines and the like, and the present invention is particularly designed as an improvement for the endless chains of shoes which form extended bearing surfaces for the vehicle.

The invention consists particularly in the construction of a flexible chain and the manner of uniting the links with each other and with the shoes which form the bearing surfaces, and the peculiar construction of said shoes.

It also consists in the formation of ball races upon which the chain and shoes are carried and by which the friction of travel is reduced.

The invention consists of the parts and the construction and combination of parts as hereinafter more fully described and claimed, having reference to the accompanying drawings, in which—

Figure 1 is a side elevation illustrating my invention. Fig. 2 is a plan view of a portion of the chain and connections. Fig. 3 is a section taken through $x$—$x$ of Fig. 2. Fig. 4 is a section taken through $y$—$y$ of Fig. 2. Fig. 5 is a transverse section taken through $z$—$z$ of Fig. 2.

A represents an internal gear having external teeth or sprockets 2.

3 is a pinion mounted upon a shaft as at 4, which pinion is adapted to engage the internal teeth of the gear wheel and thus drive it.

The chain is formed of links 5 and is of such a length that it passes around the wheel A and engages the sprocket teeth 2, which thus act to drive the chain. The length of the chain is such that when in position it forms a parallelogram with rounded ends, one of which is that portion passing around the sprocket, and the opposite end passes around a similar semi-circular guide, as plainly shown in Fig. 1. The links of the chain are each formed with two sides having a sleeve 6 at one end and at the other ends are formed shorter sleeves 7, which are separated sufficiently so that the sleeve 6 of each link will pass between the sleeves 7 at the opposite ends of the succeeding link. These are connected together by bolts 8 which are simply passed through the over-lapping ends 6—7.

9 are the shoes or treads which are bolted to the chain links as shown. These shoes are made of considerable length transversely of the chain, so as to provide a sufficient bearing and they overlap each other so as to form a continuous tread. The edges of the shoes at one end are curved downward, as shown at 10, and these downward curvatures form practically the grousers or holding projections which prevent the tread from slipping on soft or clay ground. The opposite end of each shoe extends into this over-lap and is turned downwardly as shown at 11, so that this shorter down-turned end will slide in the curvature 10 as the parts of the chain move upon each other in passing around the wheel, or the opposite end, or by movement caused by sinuosities of the ground. The two overlapping ends fit as closely as possible to prevent as much as possible, the dirt from passing into the chain and clogging the links, and the rubbing of the two curved surfaces against each other serves to clean out and eject any such dirt as may have entered. Upon each of the shoes is riveted angle plates 12. These plates have their up-turned angular portion at such a distance apart as will just admit the width of the chain links and their connections 6 and 7, and the pin or axis 8 upon which they turn is abutted between these angular plates, so that these joints are secured without screw bolts, or other expensive construction; the pins 8 being simply cut from suitably sized round steel. The upper ends of this up-turned angular portion are curved as shown at 12$^a$ and these angular pieces thus form the inner race for the balls 13, which provide the anti-frictional device. The outer ball race 14 is curved oppositely to the parts 12ª, and the position of the two curves is such that the balls are held in position and cannot escape. This part 14 is a continuous rigid structure extending around the outside, as plainly shown in Fig. 1, and is preferably formed in two parts 14 and 14ª. The part 14ª forms the semi-circular end opposite the part which passes around the wheel A. This end is pivoted to the part 14, as shown at 15, and a rigid bar 16 extends vertically from this pivot point to the opposite end of the part 14 to which it is properly secured.

In order to compensate for any change in the length of the chain by wear, or otherwise, the lower end of the part 14ª is movable to and from the lower end of the part 14; the movement taking place about the pivot 15, and the parts are retained in position by means of a shell extension 17 which may be cast with one of the parts 14 and the opposite portion being hollow, the other end, as at 14ª, will be slidable within this shell, which thus guides and keeps the parts together and forms with the two sections a continuous outer ball race. This construction is plainly shown in Fig. 1.

A rod 18 is connected at one end with the interior of the section 14ª and at the other end is slidable in a guide on the transverse bar 16. The bar 18 stands diagonally as shown, and is surrounded by a spring 19 of sufficient power to exercise a constant pressure to force the parts 14 and 14ª apart, so as to provide the necessary tension upon the chain.

A vertically disposed, guided spring 20 is here shown surrounding a slidable rod 21 having the upper end connected with the part 14 and the lower end slidable in suitable guides on the main frame. This allows the whole structure to rise and fall about the axis of the wheel A and thus yield to irregularities in the surface of the ground over which the machine is passing.

Having thus described my invention what I claim and desire to secure by Letters Patent is:—

1. In an apparatus of the character described, an endless chain composed of links flexibly coupled together, overlapping tread plates, each bolted to a chain link, angle flanges bolted to the tread plates extending upward outside the chain links and forming abutment stops for the ends of the chain link hinge pins.

2. An endless traction chain composed of links with engaging pivot ends and connecting pins, overlapping tread plates each centrally bolted to a link, angle plates riveted to the tread plates in pairs with one member of each extending upward to form stops for the hinge pins, and curved to form ball race members.

3. A traction apparatus of the character described, including an elliptical two-part trackway forming a stationary ball race member, a chain composed of links having angular plates curved to form the opposed ball race member, tread plates fixed to the chain, said plates having one end curved on a radius from the pin centers of the chain links, and the opposite ends having an opposite curve and extending into scraping contact with the first named end of the next contiguous tread plate, means to maintain the two-part trackway in alinement, and guide rods and yielding adjusting means.

4. A traction apparatus of the character described, comprising a trackway having a semicircular end and parallel continuations, a coacting semicircular track member having its upper end pivotally connected with the first-named member, and the lower ends forming telescopic slidable guides, a transverse bar crossing the ends of the first-named member, a vertical rod slidable in guides on said bar, a compressible spring acting thereon, a diagonal bar pivoted to the semicircular track member and slidable in guides on the transverse bar, and a yieldable spring thereon to automatically adjust the length of the trackway, and an endless chain adapted to travel on the trackway and having tread plates with ends curved outwardly to form overlapping joints and traction devices.

5. A traction device composed of hingedly connected chain links with tread plates, and angle plates bolted thereto and forming movable ball races, a sprocket driving wheel about which the chain passes, a stationary ball race, one portion of which is concentric with the sprocket wheel and parallel extensions therefrom, and a correspondingly curved opposite end having one end pivoted in line with one end of the first-named members, and the other in line with the other end and movable with relation thereto, said unconnected ends being telescoped and slidable to maintain the continuity of the stationary ball race.

6. An endless traction chain composed of links and tread plates fixed to the chain links, said plates being provided with curved portions forming ball race members, each of said tread plates having one end curved on a radius from the pin center of the chain links and over-lapping the opposite end of the next contiguous tread plate.

7. An endless traction chain composed of links and a tread plate secured to each link, said tread plates being arranged in alinement and each having a downwardly curved end overlapping the adjacent end of the next contiguous plate and forming a grouser or holding projection.

8. An endless tractor chain composed of connected links, a tread plate secured to each link, and plates secured to the tread plates and extending upward outside the chain links and forming abutment stops for the ends of the chain links hinge pins.

9. An endless tractor chain composed of links, pins pivotally connecting said links, tread plates secured to said links, and angle plates curved to form ball race members secured to said tread plates and forming stops for the hinge pins.

In testimony whereof I have hereunto set my hand in the presence of two subscribing witnesses.

CLARENCE A. HENNEUSE.

Witnesses:
EUGENE F. MORRIS,
CECIL MYERS.